(12) United States Patent
Cameriano et al.

(10) Patent No.: US 8,453,459 B2
(45) Date of Patent: Jun. 4, 2013

(54) FUEL INJECTION SYSTEM FOR A COMBUSTION CHAMBER OF A TURBOMACHINE

(75) Inventors: Laurent Bernard Cameriano, Avon (FR); Christophe Pieussergues, Nangis (FR); Denis Jean Maurice Sandelis, Nangis (FR)

(73) Assignee: SNECMA, Paris (FR)

( * ) Notice: Subject to any disclaimer, the term of this patent is extended or adjusted under 35 U.S.C. 154(b) by 84 days.

(21) Appl. No.: 13/031,880

(22) Filed: Feb. 22, 2011

(65) Prior Publication Data

US 2011/0203294 A1   Aug. 25, 2011

(30) Foreign Application Priority Data

Feb. 23, 2010   (FR) ..................................... 10 00724

(51) Int. Cl.
*F02G 1/00*   (2006.01)
(52) U.S. Cl.
USPC ........................................... 60/772; 60/39.11
(58) Field of Classification Search
USPC .............. 60/772, 39.11, 752, 743, 755, 756, 60/740, 796, 799, 39.37, 747, 746, 754, 757, 60/749
See application file for complete search history.

(56) References Cited

U.S. PATENT DOCUMENTS

| | | | |
|---|---|---|---|
| 5,419,115 A | 5/1995 | Butler et al. | |
| 6,792,757 B2 * | 9/2004 | Borns et al. | 60/772 |
| 8,104,533 B2 * | 1/2012 | Rini et al. | 165/80.4 |
| 2004/0083735 A1 | 5/2004 | Borns et al. | |
| 2008/0115499 A1 | 5/2008 | Patel et al. | |
| 2009/0014562 A1 * | 1/2009 | Rini et al. | 239/553.3 |

FOREIGN PATENT DOCUMENTS

| | | |
|---|---|---|
| EP | 0 461 026 A1 | 12/1991 |
| EP | 0 816 761 A2 | 1/1998 |
| EP | 1 363 078 A2 | 11/2003 |
| FR | 2 637 675 | 4/1990 |

OTHER PUBLICATIONS

French Preliminary Search Report issued Nov. 11, 2010, in French 10 00724, filed Feb. 23, 2010 (with English Translation of Category of Cited Documents).

* cited by examiner

*Primary Examiner* — Phutthiwat Wongwian
*Assistant Examiner* — Vikansha Dwivedi
(74) *Attorney, Agent, or Firm* — Oblon, Spivak, McClelland, Maier & Neustadt, L.L.P.

(57) ABSTRACT

A fuel injection system for an annular combustion chamber of a turbomachine including a support device for supporting and centering a fuel injector head; and a bowl arranged downstream from the support device and including at its downstream end an annular collar that extends radially outwards and that is cooled by air impacting against its upstream radial surface is disclosed. The upstream radial surface includes a device which disturbs the flow of cooling air and increases the heat exchange area between the air and the collar.

13 Claims, 2 Drawing Sheets

FUEL INJECTION SYSTEM FOR A COMBUSTION CHAMBER OF A TURBOMACHINE

FIELD OF THE INVENTION

The present invention relates to a fuel injection system for an annular combustion chamber of a turbomachine such as an airplane turboprop or turbojet.

An annular combustion chamber comprises two walls forming bodies of revolution, respectively an inner wall and an outer wall, which walls are connected together at their upstream ends by an annular chamber end wall that has orifices, each having a respective fuel injection system mounted therein.

A conventional fuel injection system comprises support means for supporting and centering the head of a fuel injector and a bowl of substantially frustoconical shape, which bowl is placed downstream from the means for supporting and centering the injector head, on the same axis as said means, and including at its downstream end an annular collar that extends radially outwards.

The fuel injection system has a plurality of annular rows of air-passing orifices, the air being for mixing with the fuel delivered by the injector head, for preventing coke depositing on the injection system, and/or for cooling elements of the injection system.

In operation, the abovementioned annular collar of the injection system is subjected to a high level of thermal radiation and it is cooled by the air that impacts against its upstream radial surface, said air exiting from orifices formed in the injection system.

This air comes against a radially inner portion of the collar and flows radially from the inside towards the outside along the upstream radial surface of the collar in order to cool it.

Because of the abovementioned radiation, a relatively steep temperature gradient appears in the radial direction of the collar, its radially outer portion being hotter than its radially inner portion.

BACKGROUND OF THE INVENTION

Proposals have already been made to provide a thermal barrier on the downstream radial surface of the collar in order to reduce the heating of the collar by the abovementioned radiation.

Nevertheless, although that solution enables the temperature of the collar to be reduced, it is not always very good at reducing the temperature gradient in the collar.

OBJECT AND SUMMARY OF THE INVENTION

A particular object of the invention is to provide a solution to this problem that is simple, effective, and inexpensive.

To this end, the invention provides a fuel injection system for an annular combustion chamber of a turbomachine, the system comprising support means for supporting and centering a fuel injector head, and a bowl arranged downstream from the support means and including at its downstream end an annular collar that extends radially outwards and that is cooled by air impacting against its upstream radial surface, wherein the collar includes means that are formed to project from or to be recessed into its upstream radial surface and that are designed to disturb the flow of cooling air and to increase the heat exchange area between said air and the collar.

These means give rise to disturbances in the stream of cooling air flowing over the upstream radial surface of the collar radially from the inside towards the outside, and they increase the heat exchange area between said cooling air and the collar. These means enhance the cooling of the collar by the flow of cooling air, with the collar being cooled both by impact and by the flow of cooling air over the collar.

In a preferred embodiment of the invention, the abovementioned means comprise at least one annular row of pegs or studs projecting from the upstream radial surface of the collar. These pegs or studs may be of any shape such as, for example: cylindrical, oblong, conical, frustoconical, etc. They may be fitted to and fastened on the upstream surface of the collar or they may be machined directly in the collar. The stream of cooling air flows at least in part between the pegs, radially from the inside towards the outside.

The pegs of the or each row are preferably distributed regularly around the axis of the collar.

Advantageously, each peg or stud is generally cylindrical in shape, being of a section that includes a first portion that is concave, plane, or with a reentrant angle, and a second portion that is convex or with a salient angle, the second portion being diametrically opposite from the first, which first portion is oriented radially towards the inside relative to the axis of the collar. This enables the quantity of heat flux that is exchanged between the cooling air and the pegs or studs of the collar to be increased by about 5% to about 10%. The stream of air flowing over the collar impacts against the pegs or studs, thereby creating air recirculation and increasing heat exchange between the air stream and the collar. The inner peripheral faces of the pegs or studs occupy an angle lying in the range about 40° to about 140°, for example lying in the range about 90° to about 120°, about the axes of the pegs or studs.

By way of example, each peg has a crescent-shaped section and presents a radially inner peripheral face that is concave and a radially outer peripheral face that is convex.

According to another characteristic of the invention, the abovementioned means comprise two or three annular rows of pegs, which rows are disposed one around another.

Advantageously, the pegs of one row are in a staggered configuration relative to the pegs of another row, thereby increasing the disturbances in the stream of cooling air.

The rows may have the same number of pegs. The pegs of one row have a diameter and/or a height or axial dimension that are identical or different from the diameter and/or height of the pegs of the other row(s).

The diameter of the pegs of an outer row may be determined so that the gap between the pegs of said row is less than or equal to the gap between the pegs of the or each inner row. These gaps define the flow section for the abovementioned stream of cooling air. When the gaps between the pegs in the various rows are identical, then the flow section for the air stream is constant from the radially inner portion to the radially outer portion of the collar, and the air stream remains substantially unchanged. When the gaps between the pegs of an outer row are smaller than the gaps between the pegs of an inner row, the flow section for the stream of cooling air decreases and thus the speed of the air increases on passing between the studs of the outer row.

The height or axial dimension of the pegs of an outer row may be greater than or equal to the height of the pegs of the or each inner row. When the height of the pegs in an outer row is greater than the height of the pegs in an inner row, the heat exchange areas of the pegs of the outer row are larger, thereby improving cooling of the radially outer annular portion of the collar, on which said outer row is located.

The present invention also provides an annular combustion chamber for a turbomachine, wherein the combustion chamber includes fuel injection systems as described above.

Finally, the present invention provides a turbomachine such as an airplane turboprop or turbojet, and including fuel injection systems as described above.

BRIEF DESCRIPTION OF THE DRAWINGS

The invention can be better understood and other characteristics, details, and advantages thereof appear more clearly on reading the following description made by way of non-limiting example and with reference to the accompanying drawings, in which.

MORE DETAILED DESCRIPTION

Figure 1:
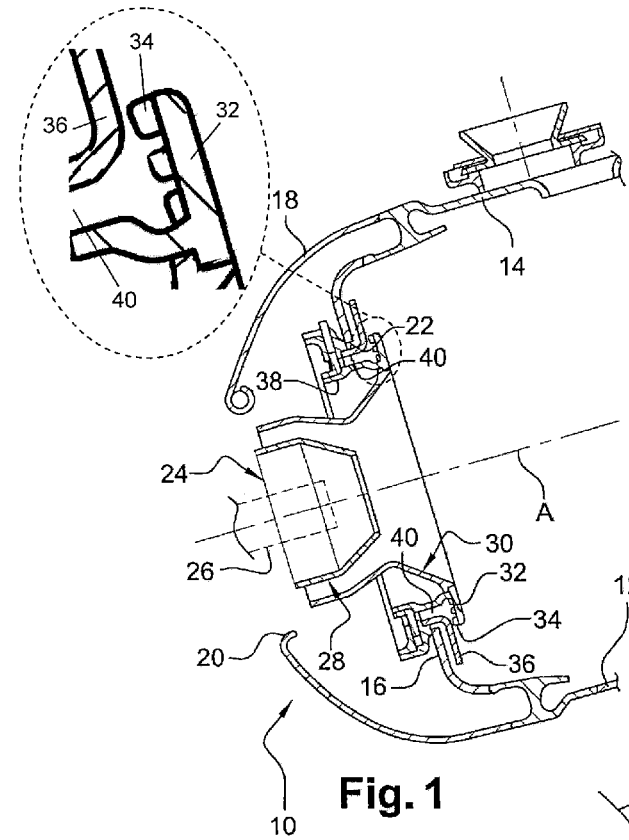
FIG. 1 is a fragmentary diagrammatic half-view in axial section of an annular combustion chamber of a turbomachine, the chamber being fitted with a fuel injection system of the invention.

FIG. 1 shows an annular combustion chamber 10 of a turbomachine, such as an airplane turboprop or turbojet, the chamber 10 being arranged at the outlet from a diffuser (not shown), itself situated at the outlet from a compressor (not shown).

The chamber 10 comprises an inner wall 12 forming a body of revolution and an outer wall 14 forming a body of revolution, which walls are connected together at their upstream ends by an annular wall 16 forming a chamber end wall.

An annular fairing 18 is fastened to the upstream ends of the walls 12 and 14 of the combustion chamber and includes air-passing openings 20 in alignment with orifices 22 in the chamber end wall 16, which orifices have fuel injection systems 24 mounted therein, the fuel being delivered by injectors that are regularly distributed around the axis of the chamber.

Each injector comprises a fuel injection head 26 engaged in an injection system 24 and in alignment on the axis A of an orifice 22 in the chamber end wall 16.

A fraction of the air flow delivered by the compressor and leaving the diffuser penetrates into the annular chamber defined by the fairing 18, passes into the injection systems 24, and is subsequently mixed with the fuel delivered by the injectors and sprayed into the combustion chamber 10.

At its upstream end, each injection system 24 includes means 28 for supporting and centering the head 26 of the injector, and at its downstream end it includes a bowl 30 of substantially frustoconical shape that is axially in alignment with the support means 28.

In the example shown, an annular deflector 36 is mounted in the orifice 22 in the chamber end wall 16 around the bowl 30 of the injection system 24. The deflector 36 has a section that is substantially L-shaped and it comprises an upstream cylindrical wall engaged in the orifice 22 and a downstream radial wall extending substantially parallel to the collar 32, downstream from the chamber end wall 16.

The cylindrical wall of the deflector 36 co-operates with a cylindrical wall 38 of the injection system to define an annular row of air-passing orifices 40, this air being designed to impact against an annular collar 32 of the injection system 24, which collar extends radially outwards from the downstream end of the bowl 30.

In operation, the collar 32 is exposed to a high level of radiation from its downstream side and it is cooled by the air leaving the orifices 40 and impacting against its upstream radial surface 34.

In the invention, means are provided on this upstream radial surface 34 of the collar 32 in order to increase the heat exchange area between the collar and the abovementioned air, and in order to disturb the centrifugal flow of said air, thereby limiting the appearance of a radial temperature gradient in the collar in operation.

In this example, these means are formed by pegs or studs 42 projecting from the upstream radial surface 34 of the collar 32.

Figure 2:
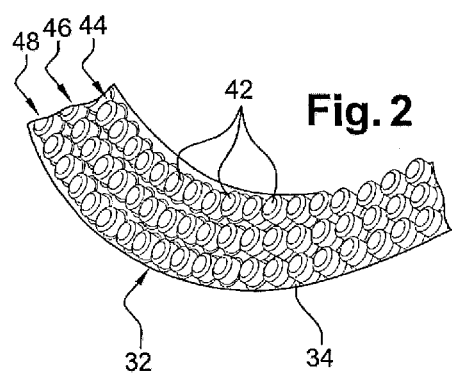
FIG. 2 is a fragmentary diagrammatic view in perspective of the annular collar of the FIG. 1 injection system.
Figure 3:
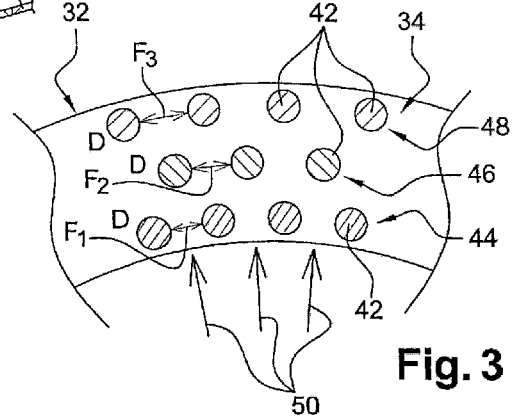
FIG. 3 is a highly diagrammatic view of the upstream radial surface of the FIG. 2 collar.

In the example shown in FIGS. 1 to 3, the collar 32 has three annular rows of pegs 42 that are disposed around one another: an inner annular row 44; an intermediate annular row 46; and an outer annular row 48. The rows 44, 46, and 48 all have the same number of pegs 42, which number is equal to the abovementioned number of air-passing orifices 40. The number of pegs 42 per row may be about 60 to 90, for example.

In this example, the pegs 42 are substantially cylindrical in shape and they are all of the same dimensions. The pegs 42 have a diameter D lying in the range about 0.4 millimeters (mm) to about 0.8 mm, and a height or axial dimension lying in the range about 0.5 mm to about 1 mm.

The gaps F3 between the pegs 42 of the outer row 48 are greater than the gaps F2 between the pegs of the intermediate row 46, which are in turn greater than the gaps F1 between the pegs of the inner row 44. Because of the increasing size of the gaps between the pegs, between the radially inner portion and the radially outer portion of the collar, the stream of air that flows between the pegs, radially from the inside towards the outside along the surface 34, decreases.

The pegs 42 of the radially inner row 44 are in a staggered configuration relative to the abovementioned orifices 40 for injecting air against the collar, so that the air streams 50 delivered via these orifices are injected between the pegs 42 of the inner row 44, as shown diagrammatically in FIG. 3. The pegs of the intermediate row 46 are in a staggered configuration relative to the pegs of the inner row 44, and the pegs of the outer row 48 are disposed in a staggered configuration relative to the pegs of the intermediate row. In other words, the pegs of the inner and outer rows 44 and 48 are in alignment in pairs in the radial direction, while the pegs of the intermediate row 46 and the outlets of the orifices 40 are in alignment in pairs.

Figure 4:
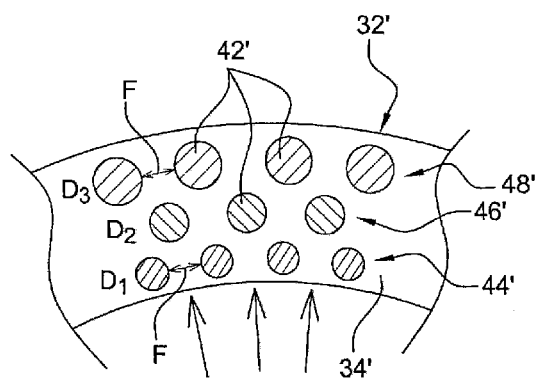
FIG. 4 is a highly diagrammatic view of the upstream radial surface of the collar in a variant embodiment of the injection system of the invention.

In the variant shown in FIG. 4, the pegs 42' of the inner row 44' have a diameter Dl that is less than the diameter D2 of the pegs of the intermediate row 46', which is itself less than the diameter D3 of the pegs of the outer row 48'. The diameters D1, D2, and D3 are determined in such a manner that the gap F between the pegs in all three rows is the same. The air stream that flows from the inside towards the outside along the upstream radial surface 34' of the collar 32' is thus constant.

Figure 5:
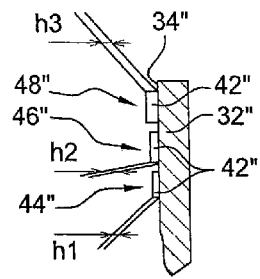
FIG. 5 is a diagrammatic half-view in axial section of the collar in another variant embodiment of the injection system of the invention.

In the variant shown in FIG. 5, the pegs 42' of the inner row 44" are of a height or axial dimension hl that is less than the height h2 of the pegs of the intermediate row 46', which is itself less than the height h3 of the pegs of the outer row 48'. This serves to increase the heat exchange areas between the air and the collar as the air stream flows from the inside towards the outside along the upstream radial surface 34" of the collar 32".

Figure 6:
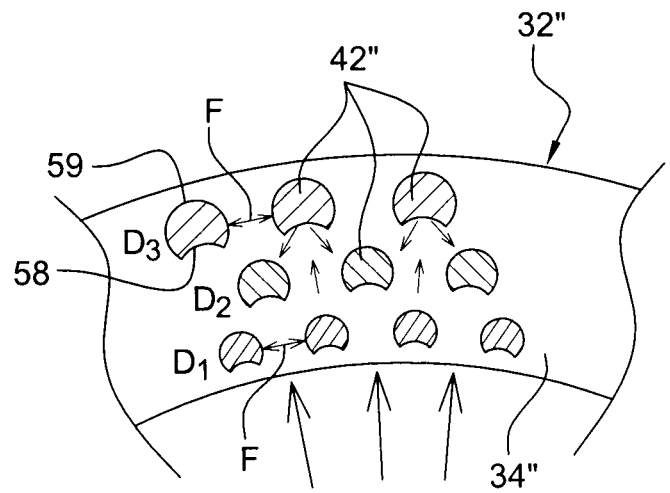
FIG. 6 is a view corresponding to FIG. 4 and shows another variant embodiment of the collar of the injection system of the invention.

In the variant of FIG. 6, the pegs 42" of the collar 32" are crescent-shaped and each of them has a concave peripheral face 58 that is oriented radially inwards (relative to the axis of the collar), and a convex peripheral face 59 that is oriented radially outwards. The air stream that flows over the upstream radial surface 34" of the collar 32" impacts against the concave faces 58 of the pegs 42", thereby causing air to recirculate and increasing heat transfer between this air stream and the collar.

Figure 7:
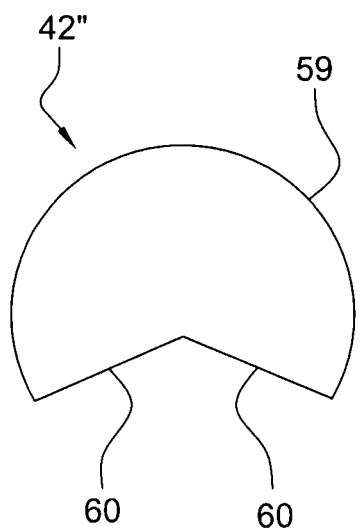
FIGS. 7 and 8 are diagrammatic views of variant embodiments of the studs or pegs of the FIG. 6 collar.
Figure 8:
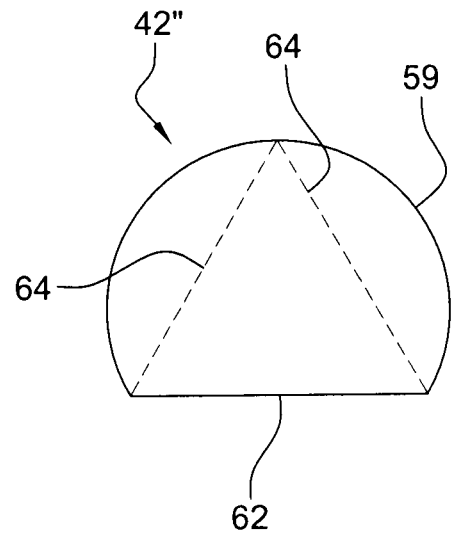

In a variant, the pegs 42" may have shapes such as those shown in FIGS. 7 and 8. The peg 42" of FIG. 7 has two adjacent and intersecting plane faces 60 in its radially inner periphery, which planes form a reentrant angle (greater than 90°). The peg 42" in FIG. 8 has a flat 62 on its radially inner periphery.

The radially outer peripheral surfaces of the pegs 42" in FIGS. 6 to 8 may in a variant be of a shape that is not cylindrical, and for example a shape that comprises a plurality of faces. The outer peripheral surfaces of the pegs 42" may for example, comprise pairs of adjacent and intersecting faces 64 forming a salient angle with its apex oriented radially outwards, as represented by dashed lines in FIG. 8, with the pegs then being triangular in section.

In yet another variant that is not shown, the means provided on the upstream radial surface of the collar may include fins or grooves or any other means suitable for disturbing the flow of the air stream injected against the collar and for increasing the heat exchange area between the collar and the air stream.

What is claimed is:

1. A fuel injection system for an annular combustion chamber of a turbomachine, the system comprising:
    a support device which supports and centers a fuel injector head;
    a bowl arranged downstream from the support device and including at its downstream end an annular collar that extends radially outwards; and
    a substantially L-shaped annular deflector extending around the bowl and having an upstream cylindrical wall and a downstream radial wall extending upstream from said annular collar, said annular collar being cooled by air which passes radially inside said upstream cylindrical wall of said substantially L-shaped annular deflector and which impacts against an upstream radial surface of said annular collar,
    wherein the collar includes a structure that is formed to project from or to be recessed into its upstream radial surface and that are designed to disturb the flow of cooling air and to increase the heat exchange area between said air and the collar.

2. A system according to claim 1, wherein the structure comprises at least one annular row of pegs or studs projecting from the upstream radial surface of the collar, the pegs of the at least one row being regularly distributed around an axis of the collar.

3. A system according to claim 2, wherein at least one peg comprises a first peripheral surface that is concave, plane, or with a reentrant angle, and a second peripheral surface that is convex or with a salient angle, the second peripheral surface being diametrically opposite to the first peripheral surface, which first peripheral surface is oriented radially inwards relative to the axis of the collar.

4. A system according to claim 3, wherein each peg has a crescent-shaped section and presents a radially inner peripheral face that is concave and a radially outer peripheral face that is convex.

5. A system according to claim 2, wherein the structure comprises two or three annular rows of pegs, which rows are disposed one around another.

6. A system according to claim 5, wherein the pegs of one row are in a staggered configuration relative to the pegs of another row.

7. A system according to claim 5, wherein the rows have the same number of pegs.

8. A system according to claim 5, wherein the pegs of one row have at least one of a diameter or a height or axial dimension that are identical or different from at least one of the diameter or height of the pegs of at least one other row.

9. A system according to claim 8, wherein the diameter of the pegs of an outer row is determined so that gap between the pegs of said outer row is less than or equal to a gap between the pegs of at least one inner row.

10. A system according to claim 8, wherein the height or axial dimension of the pegs of an outer row is greater than or equal to the height of the pegs of at least one inner row.

11. An annular combustion chamber for a turbomachine, including fuel injection systems according to claim 1.

12. A turbomachine including fuel injection systems according to claim 1.

13. A system according to claim 1, wherein an upstream surface of the radial wall of the substantially L-shaped annular deflector faces a chamber end wall of the combustion chamber, and a downstream surface of the radial wall of the substantially L-shaped annular deflector faces the structure formed on the upstream radial surface of the collar.

\* \* \* \* \*